US012662617B2

(12) United States Patent
Jones et al.

(10) Patent No.: US 12,662,617 B2
(45) Date of Patent: Jun. 23, 2026

(54) HYDROGEN REACTIVE OIL WELL CEMENT ADDITIVES

(71) Applicant: Halliburton Energy Services, Inc., Houston, TX (US)

(72) Inventors: Paul J. Jones, Houston, TX (US); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/977,011

(22) Filed: Dec. 11, 2024

(65) Prior Publication Data

US 2026/0159746 A1      Jun. 11, 2026

(51) Int. Cl.
| | |
|---|---|
| *E21B 43/34* | (2006.01) |
| *C09K 8/44* | (2006.01) |
| *E21B 33/14* | (2006.01) |

(52) U.S. Cl.
CPC .............. *C09K 8/44* (2013.01); *E21B 33/14* (2013.01)

(58) Field of Classification Search
CPC ............ C09K 8/44; E21B 33/14; E21B 43/34
USPC ........................................................ 166/292
See application file for complete search history.

(56) References Cited

U.S. PATENT DOCUMENTS

| | | | | |
|---|---|---|---|---|
| 4,501,857 A | * | 2/1985 | Kishimoto | .............. C08C 19/02 |
| | | | | 525/333.1 |
| 5,363,918 A | * | 11/1994 | Cowan | .................... C04B 28/28 |
| | | | | 507/143 |

| | | | | |
|---|---|---|---|---|
| 10,590,326 B1 | * | 3/2020 | Reddy | ...................... C09K 8/38 |
| 10,655,045 B2 | | 5/2020 | Al-Yami et al. | |
| 11,111,181 B2 | | 9/2021 | Clausen et al. | |
| 11,414,513 B2 | * | 8/2022 | Elsharif | .............. B01J 20/3416 |
| 11,732,177 B2 | * | 8/2023 | Musso | ................... C09K 8/487 |
| | | | | 166/292 |
| 2014/0166285 A1 | | 6/2014 | Santra et al. | |
| 2022/0064521 A1 | | 3/2022 | Liu et al. | |
| 2024/0093080 A1 | | 3/2024 | Lewis et al. | |

FOREIGN PATENT DOCUMENTS

| | | |
|---|---|---|
| WO | 2020050857 A1 | 3/2020 |
| WO | 2022173003 A1 | 8/2022 |

OTHER PUBLICATIONS

Foreign Communication from Related Application—International Search Report and Written Opinion of the International Searching Authority, International Application No. PCT/US2025/010664 dated Sep. 1, 2025, 11 pages.
Makungu M. Madirisha et al., "Hydrogen storage in depleted geological hydrocarbon reservoirs: Enhancing wellbore integrity and sustainability with geopolymer cement" Journal of Energy Storage 84 (2024) 11083. Department of Civil Engineering College of Science Engineering and Technology University of South Africa. 14 pages.

(Continued)

*Primary Examiner* — William D Hutton, Jr.
*Assistant Examiner* — Ashish K Varma
(74) *Attorney, Agent, or Firm* — Conley Rose, P.C.; Rodney B. Carroll

(57)                    ABSTRACT

A method including providing a cement slurry comprising particulates, wherein the particulates comprise an unsaturated hydrocarbon, which can be solid, and a hydrogenation catalyst, and placing the cement slurry downhole, for example, in a wellbore.

20 Claims, 3 Drawing Sheets

(56) References Cited

OTHER PUBLICATIONS

Adnan Aftab et al., "Geochemical Integrity of Wellbore Cements during Geological Hydrogen Storage." Environ. Sci. Technol. Lett. 2023, 10, pp. 551-556.

Anire Ju Duden et al., "Numerical Simulation of Hydrogen Diffusion in Cement Sheath of Wells Used for Underground Hydrogen Storage." Sustainability 2023, 15, 10844. 12 pages.

Nicolas Jacquemet, "Hydrogen reactivity with (1) a well cement—PHREEQC geochemical thermodynamics calculations," DOI: 10.3997/2214-4609.202021018, Conference paper—Nov. 2020, 6 pages.

Haibin Jiang, Shuliang Lu, Polymer-Supported Raney Nickel Catalysts for Sustainable Reduction Reactions, MDPI Journal, Molecules 2016, 21, 833; doi:10.3390/molecules21070833. 11 pages.

Kah Wei Ting, Low-Temperature Hydrogenation of $CO_2$ to Methanol over Heterogeneous $TiO_2$-Supported Re Catalysts, Institute for Catalysis, Hokkaido University, N-21, W-10, Sapporo 001-0021, Japan. 7 pages.

Kanchan Mondal, Low temperature soybean oil hydrogenation byan electrochemical process, Journal of Food Engineering 84 (2008) pp. 526-533.

* cited by examiner

I

II

III

HYDROGEN REACTIVE OIL WELL CEMENT ADDITIVES

CROSS-REFERENCE TO RELATED APPLICATIONS

None.

STATEMENT REGARDING FEDERALLY SPONSORED RESEARCH OR DEVELOPMENT

Not applicable.

BACKGROUND

The present disclosure relates generally to wellbore cement; more specifically, this disclosure relates to a cement slurry comprising particulates that can react with hydrogen; yet more specifically, this disclosure relates to systems and methods of wellbore cementing with a cement slurry comprising particulates comprising an unsaturated hydrocarbon (UH) and a hydrogenation catalyst (e.g., a transition metal catalyst (TMC)).

BRIEF DESCRIPTION OF THE DRAWINGS

Illustrative examples of the present disclosure are described in detail below with reference to the attached drawing figures, which are incorporated by reference herein, wherein like reference numerals represent like parts and wherein.

Figure 1:
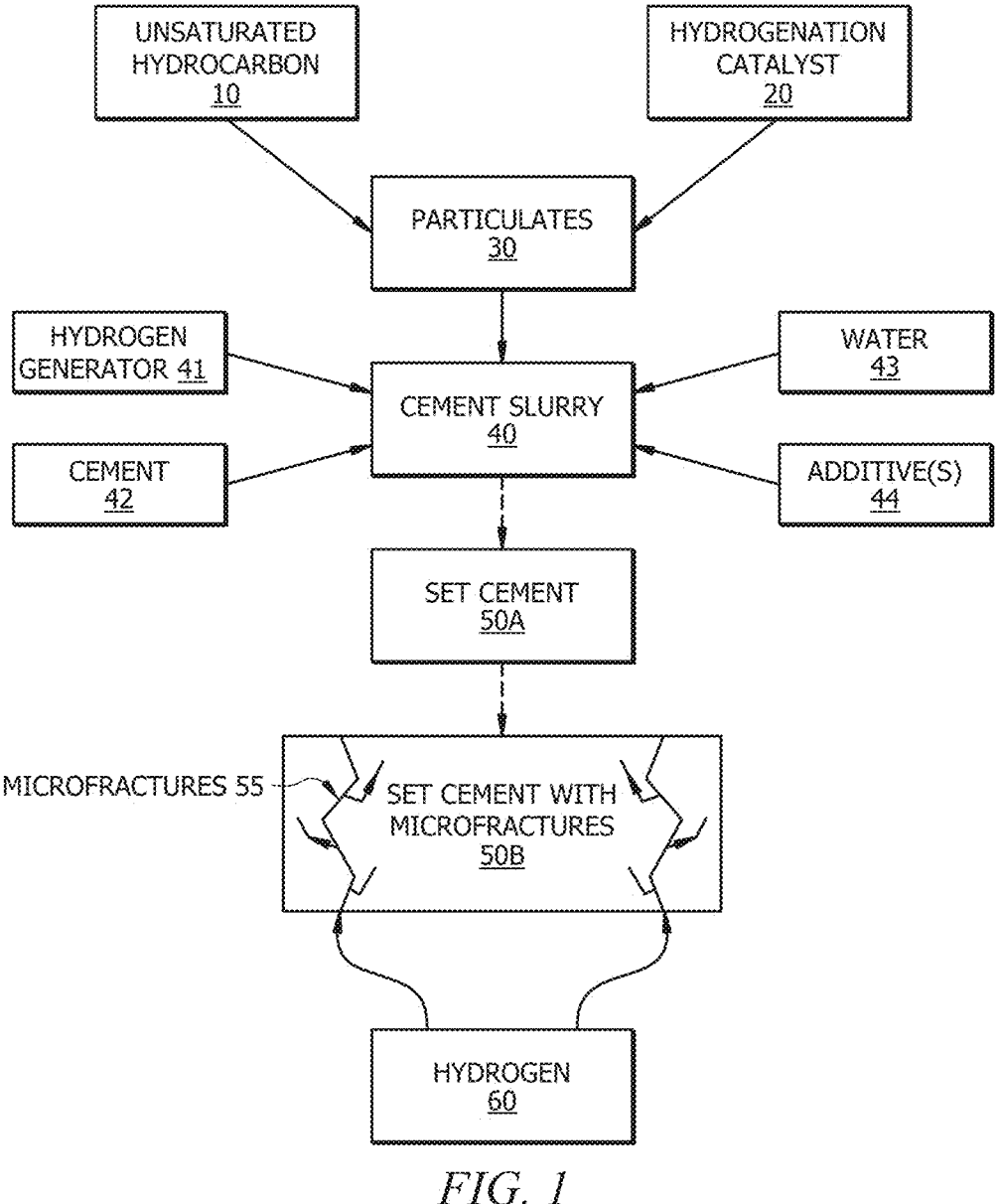
FIG. 1 is a schematic of particulates 30, according to embodiments of this disclosure.

The illustrated figures are only exemplary and are not intended to assert or imply any limitation with regard to the environment, architecture, design, or process in which different examples may be implemented.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

It should be noted that when "about" is used herein at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, particle sizes, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the illustrative embodiments described herein. At the very least, and not as an attempt to limit the application of the doctrine of equivalents to the scope of the claim, each numerical parameter should at least be construed in light of the number of reported significant digits and by applying ordinary rounding techniques. The term "about" as used herein can thus allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques.

In the following discussion and in the claims, the terms "including" and "comprising" are used in an open ended fashion, and thus should be interpreted to mean "including, but not limited to." Unless otherwise indicated, as used throughout this document, "or" does not require mutual exclusivity.

The terms uphole and downhole can be used to refer to the location of various components relative to the bottom or end of a well. For example, a first component described as uphole from a second component can be further away from the end of the well than the second component. Similarly, a first component described as being downhole from a second component can be located closer to the end of the well than the second component. The term "downhole" as used herein refers to under the surface of the earth, such as a location within or fluidly connected to a wellbore.

If there is any conflict in the usages of a word or term in this specification and one or more patent or other documents that may be incorporated herein by reference, the definitions that are consistent with this specification should be adopted.

Hydrogen is a small, volatile molecule and can pass through solid materials by diffusion or permeation. For example, when a Portland cement is used as an (e.g., annular) barrier in a gas storage well, particularly for hydrogen, the gas may permeate through the cement resulting in leakage.

As depicted schematically in FIG. 1, which is a schematic of particulates 30, according to embodiments of this disclosure, via this disclosure, particles 30 comprising a (e.g., solid) unsaturated hydrocarbon (UH) 10 and hydrogenation catalyst(s) (e.g., transition metal catalyst (TMC)) 20 can be added to wellbore cement slurry 40. In the presence of hydrogen 60, the hydrogenation (e.g., transition metal) catalyst 20 can catalyze the hydrogenation reaction between the unsaturated hydrocarbon 10 and hydrogen 60. As the particulates 30 can comprise the UH 10 and the hydrogenation catalyst 20 (e.g., TMC), the particulates 30 can be referred to herein as UH-TMC particulates 30 or simply UH-TMC 30. The hydrogenation can result in an increased volume of the particulates 30 that come into contact with the hydrogen 60, and a concomitant reduction in the permeability of the wellbore/set cement 50A/50B. In the case of a leak in a set cement (e.g., a cement sheath) 50A/50B, the particles (also referred to herein as "particulates") 30 comprising unsaturated hydrocarbon 10 and hydrogenation (e.g., transition metal) catalyst 20 can function as a self-healing additive, reducing or preventing further hydrogen 60 migration through the set cement 50A/50B.

Heretofore, there have been no expansion or self-healing additives directly targeted to reducing leakage in (e.g., hydrogen gas storage) cemented wells. The technology of this disclosure utilizes a hydrogenation reaction to reduce hydrogen permeability through a cement matrix (e.g., a set cement) and self-heal a cement matrix if a leak path develops. This technology can be directly targeted to reducing potential leakage and improving the safety and reliability of hydrogen infrastructure.

Figure 2:
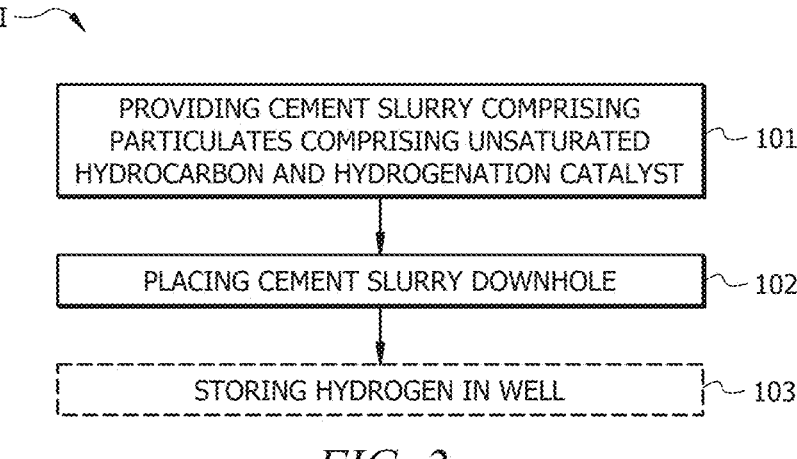
FIG. 2 is a schematic of a Method I, according to embodiments of this disclosure.

Description of a method according to this disclosure will now be made with reference to FIG. 1 and FIG. 2, which is a schematic flow diagram of a method I, according to embodiments of this disclosure. Method I comprises: providing a cement slurry 40 comprising particulates 101, and placing the cement slurry 40 downhole (e.g., in a wellbore). As detailed further hereinbelow, the particulates 30 comprise an (e.g., solid) unsaturated hydrocarbon 10 and a hydrogenation catalyst 20.

In embodiment, the unsaturated hydrocarbon 10 can comprise an unsaturated polymer, a polycyclic aromatic hydrocarbon, or a combination thereof. In embodiments, the unsaturated hydrocarbon comprises the unsaturated polymer, and the unsaturated polymer can be selected from polybutadiene, polystyrene, polychloroprene, styrene-butadiene rubber (SBR), nitrile butadiene rubber, or a combination thereof. In embodiments, the unsaturated hydrocarbon 10 comprises an unsaturated polymer, such as, and without limitation, polyisoprene, polybutadiene (PBD), styrene-butadiene rubber (SBR), chloroprene (polychloroprene), ethylene propylene diene monomer (EPDM), polyaniline (PANI), and/or polyacetylene. In embodiments, the unsaturated hydrocarbon 10 is selected from polycyclic aromatic hydrocarbons (PAHs), such as naphthalene, anthracene, and phenanthrene; solid dienes (e.g., conjugated or isolated), such as 1,3-butadiene polymerized into solid forms or isoprene-based rubber compounds; alkene polymers with residual double bonds, such as natural rubber (cis-1,4- polyisoprene), and/or polybutadiene; and unsaturated fatty acid derivatives in solid form comprising long-chain alkenes (often with one or more double bonds) that appear in solid forms, especially in fats or waxes, such as stearolic acid, elaidic acid (trans isomer of oleic acid). In embodiments, the unsaturated hydrocarbon 10 comprises the polycyclic aromatic hydrocarbon, and the polycyclic aromatic hydrocarbon can comprise naphthalene, anthracene, phenanthrene, or a combination thereof. Hydrogenation of polymers can improve the chemical and thermal stability of the polymers. The hydrogenated polymers can comprise hydrogenated polybutadiene (HPBD), hydrogenated styrene-butadiene rubber (HSBR), hydrogenated nitrile butadiene rubber (HNBR), or another hydrogenated polymer.

The hydrogenation catalyst 20 can comprise a transition metal catalyst (TMC). The transition metal catalyst can comprise a transition metal. In embodiments, the transition metal can be selected from iron, copper, cobalt, nickel, osmium, palladium, platinum, rhodium, ruthenium, iridium, or a combination thereof. In embodiments, the transition metal hydrogenation catalyst 20 comprises iron, copper, cobalt, nickel, or a combination thereof. The transition metal can be in metallic form and/or can be present as an organic complex comprising (e.g., consisting of) a ligand and a central transition metal. The ligand is the organic molecule bound to the central transition metal to form the coordination complex or organic complex. The ligand can have a strong influence the efficacy of the catalyst. As noted above, the metal can be selected from transition metals of iron, copper, cobalt, nickel, osmium, palladium, platinum, rhodium, ruthenium, iridium, or a combination thereof. The ligand can be or comprise a phosphine, n-heterocyclic carbene, pincer, or chiral.

A method I (or method II described hereinbelow with reference to FIG. 3 or method III described hereinbelow with reference to FIG. 4) of this disclosure can further comprise forming the particulates 30 by combining the hydrogenation catalyst 20 with the unsaturated hydrocarbon 10. The hydrogenation catalyst 20 and the unsaturated hydrocarbon 10 can be combined by any suitable methods. For example, in embodiments, combining the hydrogenation catalyst 20 with the unsaturated hydrocarbon 10 can be effected by physical blending, in-situ polymerization, solvent casting, surface functionalization, or a combination thereof. In embodiments, combining the hydrogenation catalyst 20 with the unsaturated hydrocarbon 10 can comprise coating the unsaturated hydrocarbon 10 with the hydrogenation catalyst 20 (e.g., such that the hydrogenation catalyst 20 (e.g., TMC) is enriched at the surface of the unsaturated hydrocarbon 10). Coating can comprise spraying the unsaturated hydrocarbon 10 with the hydrogenation catalyst 20, dipping the unsaturated hydrocarbon 10 in the hydrogenation catalyst 20, or a combination thereof.

The particulate 30 can comprise an amount of hydrogenation catalyst 20 relative to the degree of unsaturation of the unsaturated hydrocarbon 10 (e.g., an amount of unsaturated bonds therein) such that the hydrogenation catalyst 20 and the unsaturated hydrocarbons 10 are in sufficient proximity to be effective to carry out the hydrogenation reaction. The particulates 30 can have any suitable shape and size. For example, in embodiments, the particulates 30 can have a D50, as measured by a particle size analyzer, in a range of from about 0.01 to about 5 mm, from about 0.1 to about 2.5 mm, or from about 0.5 to about 1 mm, and/or a shape selected from spherical, rod-shaped, disc-shaped, or irregular.

The cement slurry 40 can further include a cementitious material (also referred to herein simply as "cement") 42, water 43, and/or one or more additives 44. The cementitious material can comprise, for example, and without limitation, a Portland cement. A variety of cementitious materials can be used in the cement slurry 40, including cementitious materials comprised of calcium, aluminum, silicon, oxygen, and/or sulfur which set and harden by reaction with water. Suitable hydraulic or pozzolanic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. In embodiments, cementitious material 42 comprises a Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, cementitious material 42 comprises a non-API cement. In embodiments, cementitious material 42 comprises an API cement, such as, for example, an API Portland cement from Class A, B, C, D, E, F, G, H, K, and/or L, such as from one or more of Classes A, C, H, and G.

The cement slurry 40 can further include water 43. Water 43 can comprise an aqueous base fluid. Aqueous base fluid 43 can be present in the cement slurry 40 in an amount sufficient to make a slurry which is pumpable for introduction to a desired location in a workspace, for example, down hole, in embodiments. In embodiments, the aqueous base fluid or water 43 comprises fresh water; brackish water; saltwater; or a combination thereof. In embodiments, the water 43 can be present in the cement slurry 40 in an amount of from about 20% to about 80% by weight of cement ("bwoc"), from about 28% to about 60% bwoc, or from about 36% to about 66% bwoc.

The cement slurry 40 of this disclosure can contain one or more additives 44. In embodiments, the additives 44 can comprise one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof.

In embodiments, the cement slurry 40 can comprise LifeCem™ 100, WellLife® 665, WellLife® 708, WellLife® 809, WellLife® 930 and/or ChannelFix™ Cement Additive, available from Halliburton Energy Services, Inc, which contain unsaturated hydrocarbon 10 polymers.

In embodiments, the cement slurry 40 can have a slurry density which is pumpable for introduction down hole. In embodiments, the density of the cement slurry 40 is from about 7 pounds per gallon (ppg) to about 20 ppg, from about 10 ppg to about 18 ppg, or from about 13 ppg to about 17 ppg.

Placing the cement slurry 40 downhole 102 can comprise using the cement slurry 40 during primary cementing of a hydrogen storage well, for example as described further hereinbelow with reference to FIG. 5. In such embodiments, the method I can further comprise storing hydrogen 60 in the hydrogen storage well after the cement slurry 40 has set to provide a set (e.g., hardened) cement 50A, as indicated at 103. The set cement 50A/50B can thus serve as containment for the hydrogen 60 stored in the hydrogen storage well, in embodiments. As seen in FIG. 1, after a time period (indicated by dashed line from set cement 50A to set cement 50B comprising fractures 55), microfractures (e.g., microannuli) 55 can be present in or be created in the set cement 50A. Hydrogen 60 can migrate into the microfractures 55. Exposure of the particulates 30 to the hydrogen 60 migrating into the microfractures 55 can result in hydrogenation, catalyzed by the hydrogenation catalyst 20, of the unsaturated hydrocarbon 10 of the particulates 30 in the set cement 50A that come into contact with the migrating hydrogen 60. The hydrogenation can result in expansion of the particulates 30 (e.g., thus self-healing the cement 50B/closing off the microfractures 55) to reduce or eliminate the further migration of the hydrogen 60 through the set cement 50A/50B. Although described as microannuli 55, the microfractures 55 can have any size or shape, so long as they provide a pathway for a fluid (e.g., a gas or supercritical fluid, such as hydrogen 60) to migrate therein.

In embodiments, the cement slurry 40 further comprises a hydrogen generating additive 41 (e.g., also referred to as a hydrogen generator), such as, for example, a coated aluminum powder such as SUPER CBL Additive available from Halliburton Energy Services, Inc. In such embodiments, microfractures (e.g., microannuli) 55 produced in the set cement 50A/50B during and/or subsequent setting of the cement slurry 40 to provide the set cement 50A/50B can be sealed via hydrogenation of the unsaturated hydrocarbon 10, catalyzed by the hydrogenation catalyst 20, which results in expansion of (e.g., an increase in volume of) the particulates 30 with which the hydrogen 60 produced by the hydrogen generator 41 comes into contact. The hydrogenation can provide a reduction of a permeability of the set cement 50A/50B (e.g., thus sealing the microfractures 55 of the set cement 50B with the microfractures 55 to provide a set cement 50A with fewer or no microfractures 55).

After placing the cement slurry 40 downhole, geological hydrogen (e.g., hydrogen 60 from a formation such as formation 318 of FIG. 4, described hereinbelow), can migrate through microfractures 55 that form in the set cement 50A (to form the set cement with microfractures as shown at 50B), and reaction of the migrating hydrogen 60 with the unsaturated hydrocarbon 10 of the particulates 30, catalyzed by the hydrogenation catalyst 20, can seal the microfractures 55 that come into contact with the migrating hydrogen 60, thus halting the migration of the hydrogen 60 (e.g., sealing the microfractures 55).

In embodiments, where the set cement is absent of microfractures or microannuli, hydrogenation of the unsaturated hydrocarbon can reduce the porosity and/or permeability of hydrogen through the set cement.

Figure 3:
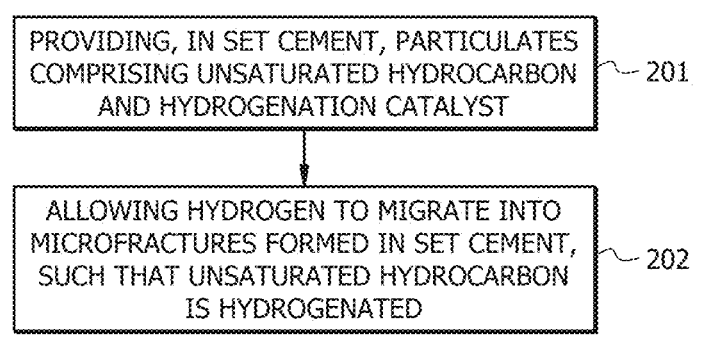
FIG. 3 is a schematic of a Method II, according to embodiments of this disclosure.

Description of a method of this disclosure according to embodiments will now be made with reference to FIG. 3, which is a schematic of a Method II, according to embodiments of this disclosure. A Method II of hydrogenating an (e.g., solid) unsaturated hydrocarbon 10 in microfractures 55 in a set cement 50A/50B (e.g., a cement sheath surrounding a tubular 316/in an annulus 317 within a wellbore (also referred to herein simply as a "well") 322 of a subterranean formation 318, as described further hereinbelow with reference to FIG. 5) can comprise: providing, in the set cement 50A/50B, particulates 30 comprising the unsaturated hydrocarbon 10 and a hydrogenation catalyst 20, as indicated at 201; and allowing (e.g., with time, as indicated by dashed arrow in FIG. 1) microfractures (e.g., microannuli) 55 to form in the set cement 50A to provide set cement with microfractures 50B, such that hydrogen 60 migrating into the microfractures 55 reacts with unsaturated hydrocarbon 10 of the particulates 30 and reacts therewith, in the presence of the hydrogenation catalyst 20, via a hydrogenation reaction, to hydrogenate the unsaturated hydrocarbon 10, as indicated at 202.

As described hereinabove with reference to FIG. 2, the hydrogen 60 migrating into the microfractures 55 can comprise a quantity of hydrogen 60 stored in the wellbore (e.g., wellbore 322 of FIG. 5 described further hereinbelow); geological (e.g., formation) hydrogen 60 from the formation 318 (e.g., formation 318 of FIG. 5 described further hereinbelow) in which the wellbore 322 (e.g., wellbore 322 of FIG. 5 described further hereinbelow) is positioned; and/or hydrogen 60 produced by a hydrogen generator 41 in a cement slurry 41 which was placed in the wellbore 322 (e.g., wellbore 322 of FIG. 5 described further hereinbelow) and allowed to set to form the set cement 50A/50B. The particulates 30 can be as described hereinabove with reference to FIG. 1 and FIG. 2.

Description of a method of this disclosure according to embodiments will now be made with reference to FIG. 4, which is a schematic of a Method III, according to embodiments of this disclosure. Method III can comprise: drilling a wellbore (e.g., wellbore 322, as described hereinbelow with reference to FIG. 5), as indicated at 301; and, as indicated at 302, cementing the well, such as well 322 described further hereinbelow with reference to FIG. 5, (e.g., during a primary cementing operation) with a cement slurry 40 to provide a set cement 50A/50B (e.g., a containment sheath), wherein the cement slurry 40 comprises particulates 30, and wherein, as described hereinabove with reference to FIG. 1 and FIG. 2, the particulates 30 comprise a (e.g., solid) unsaturated hydrocarbon 10 and a hydrogenation catalyst 20, whereby microfractures (e.g., microannuli) 55 that form in the set cement (e.g., sheath) 50A/50B are self-healed via reaction, catalyzed by the hydrogenation catalyst 20, of hydrogen 60 migrating into the microfractures 55 with the unsaturated hydrocarbon 10 of the particulates 30 (which hydrogenation expands the unsaturated hydrocarbon 10/reduces permeability of the cement sheath/set cement 50A/50B) to reduce or prevent further hydrogen 60 migration through the set cement (e.g., sheath)) 50A/50B.

Figure 4:
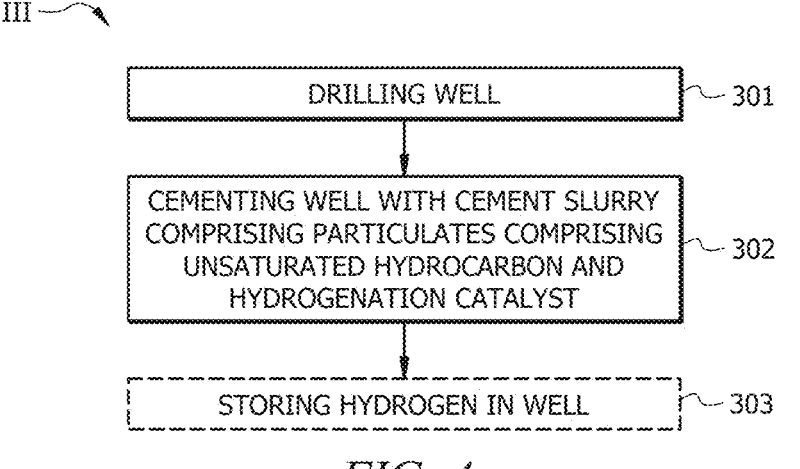
FIG. 4 is a schematic of a Method III, according to embodiments of this disclosure.

As depicted in dashed box in FIG. 4, method III can further comprise, as indicated at 303, storing hydrogen 60 in the well (e.g., well 322 of FIG. 5, described further hereinbelow), wherein the set cement (e.g., cement sheath) 50A/50B serves as hydrogen containment. In embodiments, the hydrogen 60 migrating to the microfractures 55 can comprise hydrogen 60 stored in the well. In embodiments, the hydrogen 60 migrating into the microfractures 55 can comprise geological/formation hydrogen 60 entering the microfractures 55 from a formation (e.g., formation 318 of FIG. 5 described hereinbelow) in which the well (e.g., well 322 of FIG. 5 described hereinbelow) is positioned. In embodiments, the hydrogen 60 migrating into the microfractures 55 can comprise hydrogen 60 produced by a hydrogen generator 41 (e.g., coated aluminum powder, such as Super CBL available from Halliburton Energy Services, Inc.) in the cement slurry 40. The particulates 30 can be as described hereinabove with reference to FIG. 1, FIG. 2, and FIG. 3.

Also disclosed herein is a system 300 comprising: a set cement 50A/50B (e.g., a cement sheath) produced by allowing a cement slurry 40 to set, wherein the cement slurry 40 comprises: particulates 30, wherein the particulates 30 comprise a (e.g., solid) unsaturated hydrocarbon 10 and a hydrogenation catalyst 20. Hydrogen 60 migrating into microfractures 55 of the set cement 50A/50B (e.g., cement sheath) can react with the unsaturated hydrocarbon 10 via hydrogenation reaction, catalyzed by the hydrogenation catalyst 20, to self-heal the microfractures 55, thus minimizing and/or preventing further migration of the hydrogen 60 into the microfractures 55. In embodiments, the well 322 can be a hydrogen storage well, and the hydrogen 60 migrating into the microfractures 55 can comprise hydrogen 60 that was stored in the hydrogen storage well 322. In embodiments, the hydrogen 60 migrating into the microfractures 55 can comprise geological/formation hydrogen 50 from a formation in which the well is positioned/drilled (e.g., formation 318 of FIG. 5, described hereinbelow). In embodiments, the hydrogen 60 migrating into the microfractures 55 comprises hydrogen generated by a hydrogen generator 41 in the cement slurry 40 (e.g., Super CBL, coated aluminum powder).

Figure 5:
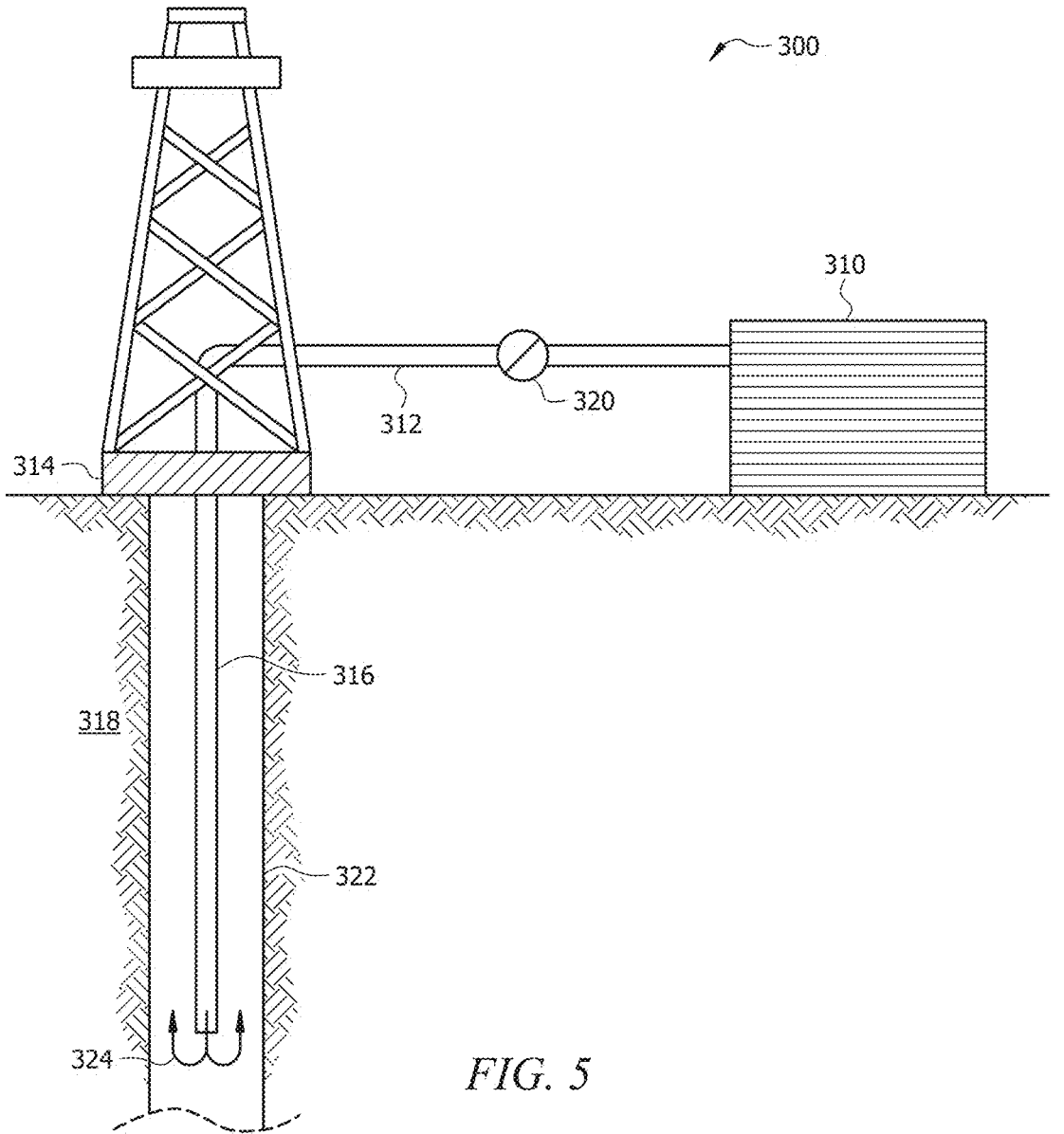
FIG. 5 is a schematic of a cementing workspace 300, according to embodiments of this disclosure.

FIG. 5 shows an illustrative schematic of cementing workspace or system 300 that can deliver cement slurry 40 of the present disclosure to a downhole location, according to one or more embodiments. It should be noted that while FIG. 5 generally depicts a land-based system, it is to be recognized that like systems may be operated in subsea locations as well. As depicted in FIG. 5, system 300 may include mixing tank 310, in which a cement slurry 40 of the present disclosure may be formulated. Again, in some embodiments, the mixing tank 310 may represent or otherwise be replaced with a transport vehicle or shipping container configured to deliver or otherwise convey the final cement slurry to the well site. The cement slurry 40 may be conveyed via line 312 to wellhead 314, where the cement slurry 40 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the cement slurry 40 may subsequently return up the wellbore in the annulus between the tubular 316 and the wellbore 322 as indicated by flow lines 324. In other embodiments, the cement slurry 40 may be reverse pumped down through the annulus and up tubular 316 back to the surface, without departing from the scope of the disclosure. Pump 320 may be configured to raise the pressure of the cement slurry to a desired degree before its introduction into tubular 316 (or annulus). It is to be recognized that system 300 is merely exemplary in nature and various additional components may be present that have not necessarily been depicted in FIG. 5 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the final cement slurry is directly placed in the annulus between the tubular 316 and the wellbore 322 may also be performed in accordance with the embodiments described herein, without departing from the present disclosure. As noted hereinabove, in embodiments, well 322 can be a hydrogen storage well.

One skilled in the art, with the benefit of this disclosure, should recognize the changes to the system described in FIG. 5 to provide for other cementing operations squeeze operations, reverse cementing (where the cement is introduced into an annulus between a tubular and the wellbore and returns to the wellhead through the tubular), and the like.

It is also to be recognized that the disclosed cement slurries 40 may also directly or indirectly affect the various downhole equipment and tools that may come into contact with the final cement slurry during operation. Such equipment and tools may include, but are not limited, to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 5.

According to this disclosure, a solid particulate 30 of an unsaturated hydrocarbon (UH) 10 can be combined with a hydrogenation catalyst (e.g., a transition metal catalyst (TMC)) 20 to form a (e.g., UH-TMC) particulate 30. The UH-TMC particulate 30 can be added to a cement slurry admixture 40. Exposure of the UH-TMC particulate 30 to hydrogen 60 can result in hydrogenation of the UH 10 catalyzed by the TMC 20, resulting in expansion and self-healing of the set cement 50A/50B.

The TMC hydrogenation catalyst 20 can be combined with the UH 10 by physical blending, in-situ polymerization, solvent casting, and/or surface functionalization. The TMC hydrogenation catalyst 20 can be enriched at the surface of the UH 10 by application as a coating. The coating process may include spraying or dipping. Additional enrichment processes can include solvent casting and swelling the UH 10 in a suspension of the TMC hydrogenation catalyst 20, followed by drying. In embodiments, the cement slurry 40 admixture can be utilized for primary cementing of hydrogen storage well 322. However, the methods of this disclosure are not to be limited to hydrogen storage wells, as the system and methods of this disclosure can also apply to wells where hydrogen is generated from additives 41 in the cement slurry 40 (e.g. aluminum powder, such as Super CBL), and/or geological hydrogen from a subterranean formation 318 in which the well 322 is positioned.

In situ hydrogenation of unsaturated hydrocarbons can be utilized as described herein to produce expansion and self-healing capabilities in cement slurries 40 used to build hydrogen infrastructure.

ADDITIONAL DISCLOSURE

The following are non-limiting, specific embodiments in accordance with the present disclosure:

In a first embodiment, a method comprises: providing a cement slurry comprising particulates, wherein the particulates comprise an (e.g., solid) unsaturated hydrocarbon and a hydrogenation catalyst; and placing the cement slurry downhole (e.g., in a wellbore).

A second embodiment can include the method of the first embodiment, wherein the hydrogenation catalyst comprises a transition metal catalyst.

A third embodiment can include the method of the second embodiment, wherein the transition metal catalyst comprises iron, copper, cobalt, nickel, palladium, platinum, osmium, rhodium, ruthenium, iridium, or a combination thereof.

A fourth embodiment can include the method of the third embodiment, wherein the transition metal catalyst comprises iron, copper, cobalt, nickel, or a combination thereof.

A fifth embodiment can include the method of any one of the first to fourth embodiments, wherein the unsaturated hydrocarbon comprises an unsaturated polymer, a polycyclic aromatic hydrocarbon, or a combination thereof.

A sixth embodiment can include the method of the fifth embodiment, wherein the unsaturated hydrocarbon comprises the unsaturated polymer, wherein the unsaturated polymer comprises polybutadiene, polystyrene, polychloroprene, styrene-butadiene rubber, nitrile butadiene rubber, or a combination thereof.

A seventh embodiment can include the method of the fifth or sixth embodiment, wherein the unsaturated hydrocarbon comprises the polycyclic aromatic hydrocarbon, wherein the polycyclic aromatic hydrocarbon comprises naphthalene, anthracene, phenanthrene, or a combination thereof.

An eighth embodiment can include the method of any one of the first to seventh embodiments, wherein the transition metal is in metallic form and/or present as an organic complex comprising (e.g., consisting of) a ligand and a central metal.

A ninth embodiment can include the method of any one of the first to eighth embodiments, wherein placing the cement slurry downhole comprises using the cement slurry during primary cementing of a hydrogen storage well.

A tenth embodiment can include the method of the ninth embodiment further comprising storing hydrogen in the hydrogen storage well after the cement slurry has set to provide a set (e.g., hardened) cement.

An eleventh embodiment can include the method of the tenth embodiment, wherein, after a time period, microfractures (e.g., microannuli) are created in the set cement, and hydrogen migrates into the microfractures, wherein exposure of the particulates to the hydrogen in the microfractures results in hydrogenation, catalyzed by the hydrogenation catalyst, of the unsaturated hydrocarbon of the particulates, resulting in expansion of the particulates (e.g., thus self-healing the cement) to reduce or eliminate the migration of the hydrogen.

A twelfth embodiment can include the method of the tenth or eleventh embodiment, wherein (e.g., even in the absence of microfracture formation), a permeability of the set cement is reduced (e.g., relative to that of an otherwise same set cement produced from a cement slurry absent the unsaturated hydrocarbon and/or the hydrogenation catalyst) via hydrogenation, in the presence of the hydrogenation catalyst (e.g., the transition metal catalyst), of the unsaturated hydrocarbon with the hydrogen.

A thirteenth embodiment can include the method of any one of the first to twelfth embodiments further comprising forming the particulates by combining the hydrogenation catalyst with the unsaturated hydrocarbon.

A fourteenth embodiment can include the method of the thirteenth embodiment, wherein combining the hydrogenation catalyst with the unsaturated hydrocarbon is effected by physical blending, in-situ polymerization, solvent casting, surface functionalization, or a combination thereof.

A fifteenth embodiment can include the method of the thirteenth or fourteenth embodiment, wherein combining the hydrogenation catalyst with the unsaturated hydrocarbon comprises coating the unsaturated hydrocarbon with the hydrogenation catalyst (e.g., such that the hydrogenation catalyst (e.g., TMC) is enriched at the surface of the unsaturated hydrocarbon).

A sixteenth embodiment can include the method of the fifteenth embodiment, wherein coating comprises spraying the unsaturated hydrocarbon with the hydrogenation catalyst, dipping the unsaturated hydrocarbon in the hydrogenation catalyst, or a combination thereof.

A seventeenth embodiment can include the method of any one of the first to sixteenth embodiments, wherein the cement slurry further comprises a hydrogen generating additive (e.g., a hydrogen generator, such as Super CBL comprising a coated aluminum powder), and wherein microfractures (e.g., microannuli) produced in the cement during and/or subsequent setting of the cement slurry are sealed via hydrogenation of the unsaturated hydrocarbon, catalyzed by the hydrogenation catalyst, which results in expansion of (e.g., an increase in volume of) the particulates with which the hydrogen comes into contact, and reduction of a permeability of the cement (e.g., thus sealing the microfractures).

An eighteenth embodiment can include the method of any one of the first to seventeenth embodiments, wherein, after placing the cement slurry downhole, geological hydrogen (e.g., hydrogen from the formation), migrates through microfractures in the cement, and reaction of the migrating hydrogen with the unsaturated hydrocarbon of the particulates, catalyzed by the hydrogenation catalyst, seals the microfractures, thus halting the migration of the hydrogen (e.g., sealing the microfractures).

A nineteenth embodiment can include the method of any one of the first to eighteenth embodiments, wherein the particulate comprise an amount of hydrogenation catalyst relative to the degree of unsaturation of the unsaturated hydrocarbon such that the hydrogenation catalyst and the unsaturated hydrocarbons are in sufficient proximity to be effective to carry out the hydrogenation reaction.

A twentieth embodiment can include the method of any one of the first to nineteenth embodiments, wherein the particulates have a D50, as measured by a particle size analyzer, in a range of from about 0.01 to about 5 mm, from about 0.1 to about 2.5 mm, or from about 0.5 to about 1 mm, and/or a shape selected from spherical, rod-shaped, disc-shaped, or irregular.

In a twenty first embodiment, a method comprises hydrogenating an (e.g., solid) unsaturated hydrocarbon in microfractures in a set cement (e.g., a cement sheath surrounding a tubular/in an annulus within a wellbore) positioned in a wellbore of a subterranean formation by: providing in the set cement particulates comprising the unsaturated hydrocarbon and a hydrogenation catalyst; and allowing (e.g., with time) microfractures (e.g., microannuli) to form in the set cement, such that hydrogen migrating into the microfractures reacts with unsaturated hydrocarbon of the particulates and reacts therewith, in the presence of the hydrogenation catalyst, via a hydrogenation reaction, to hydrogenate the unsaturated hydrocarbon.

A twenty second embodiment can include the method of the twenty first embodiment, wherein the hydrogen migrating into the microfractures is from a quantity of hydrogen stored in the wellbore; geological (e.g., formation) hydrogen from the formation in which the wellbore is positioned; and/or hydrogen produced by a hydrogen generator in a cement slurry which was placed in the wellbore and allowed to set to form the set cement.

In a twenty third embodiment, a method comprises: drilling a wellbore; and cementing the well (e.g., during a primary cementing operation) with a cement slurry comprising particulates, wherein the particulates comprise a (e.g., solid) unsaturated hydrocarbon and a hydrogenation catalyst to provide a set cement (e.g., containment sheath), whereby microfractures (e.g., microannuli) that form in the set cement (e.g., sheath) are self-healed via reaction, catalyzed by the hydrogenation catalyst, of hydrogen migrating into the microfractures with the unsaturated hydrocarbon of the particulates (which hydrogenation expands the unsaturated hydrocarbon/reduces permeability of the cement sheath/set cement) to prevent further hydrogen migration through the set cement (e.g., sheath).

A twenty fourth embodiment can include the method of the twenty third embodiment further comprising storing hydrogen in the well, wherein the set cement (e.g., cement sheath) serves as hydrogen containment, wherein the hydrogen migrating to the microfractures comprises stored hydrogen.

A twenty fifth embodiment can include the method of the twenty third or twenty fourth embodiment, wherein the hydrogen migrating into the microfractures comprises geological/formation hydrogen.

A twenty sixth embodiment can include the method of any one of the twenty third to twenty fifth embodiments, wherein the hydrogen migrating into the microfractures comprises hydrogen produced by a hydrogen generator (e.g., coated aluminum powder, such as Super CBL) in the cement slurry.

In a twenty seventh embodiment, a well comprises: a set cement (e.g., a cement sheath) produced by allowing a cement slurry to set, wherein the cement slurry comprises: particulates, wherein the particulates comprise a (e.g., solid) unsaturated hydrocarbon and a hydrogenation catalyst.

A twenty eighth embodiment can include the well of the twenty seventh embodiment further comprising hydrogen migrating into microfractures of the set cement (e.g., cement sheath) which reacts with the unsaturated hydrocarbon via hydrogenation reaction, catalyzed by the hydrogenation catalyst, to self-heal the microfractures, thus minimizing and/or preventing further migration of the hydrogen into the microfractures.

A twenty ninth embodiment can include the well of the twenty eighth embodiment, wherein the well is a hydrogen storage well, and wherein the hydrogen migrating into the microfractures comprises hydrogen that was stored in the hydrogen storage well.

A thirtieth embodiment can include the well of the twenty eighth or twenty ninth embodiment, wherein the hydrogen migrating into the microfractures comprises geological/formation hydrogen.

A thirty first embodiment can include the well of any one of the twenty eighth to thirtieth embodiments, wherein the hydrogen migrating into the microfractures comprises hydrogen generated by a hydrogen generator (e.g., Super CBL, a coated aluminum powder) in the cement slurry.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=R1+k*(Ru-R1)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
   providing a cement slurry comprising particulates, wherein the particulates comprise an unsaturated hydrocarbon and a hydrogenation catalyst;
   placing the cement slurry downhole; and
   allowing the cement slurry to set to provide a set cement, wherein, after a time period, microfractures are created in the set cement, and hydrogen migrates into the microfractures, wherein exposure of the particulates to the hydrogen in the microfractures results in hydrogenation, catalyzed by the hydrogenation catalyst, of the unsaturated hydrocarbon of the particulates, resulting in expansion of the particulates to reduce or eliminate the migration of the hydrogen.

2. The method of claim 1, wherein the hydrogenation catalyst comprises a transition metal catalyst.

3. The method of claim 1, wherein the unsaturated hydrocarbon comprises an unsaturated polymer, a polycyclic aromatic hydrocarbon, or a combination thereof.

4. The method of claim 3, wherein the unsaturated hydrocarbon comprises the unsaturated polymer, wherein the unsaturated polymer comprises polybutadiene, polystyrene, polychloroprene, styrene-butadiene rubber, nitrile butadiene rubber, or a combination thereof.

5. The method of claim 3, wherein the unsaturated hydrocarbon comprises the polycyclic aromatic hydrocarbon, wherein the polycyclic aromatic hydrocarbon comprises naphthalene, anthracene, phenanthrene, or a combination thereof.

6. The method of claim 1, wherein placing the cement slurry downhole comprises using the cement slurry during primary cementing of a hydrogen storage well.

7. The method of claim 6 further comprising storing hydrogen in the hydrogen storage well after the cement slurry has set to provide a set cement.

8. The method of claim 7, wherein, a permeability of the set cement is reduced via hydrogenation, in the presence of the hydrogenation catalyst, of the unsaturated hydrocarbon with the hydrogen.

9. The method of claim 1, wherein the cement slurry further comprises a hydrogen generating additive, and wherein microfractures produced in the cement during and/ or subsequent setting of the cement slurry are sealed via hydrogenation of the unsaturated hydrocarbon, catalyzed by the hydrogenation catalyst, which results in expansion of the particulates with which the hydrogen comes into contact, and reduction of a permeability of the cement.

10. The method of claim 1, wherein, after placing the cement slurry downhole, geological hydrogen, migrates through microfractures in the cement, and reaction of the migrating hydrogen with the unsaturated hydrocarbon of the particulates, catalyzed by the hydrogenation catalyst, seals the microfractures, thus halting the migration of the hydrogen.

11. The method of claim 1, wherein the particulate comprise an amount of hydrogenation catalyst relative to the degree of unsaturation of the unsaturated hydrocarbon such that the hydrogenation catalyst and the unsaturated hydrocarbons are in sufficient proximity to be effective to carry out the hydrogenation reaction.

12. The method of claim 1, wherein the hydrogen comprises geological hydrogen present in a downhole formation in contact with the set cement.

13. The method of claim 1, wherein the hydrogen comprises hydrogen introduced downhole subsequent setting of the cement slurry.

14. A method comprising:
   drilling a wellbore; and
   cementing the well with a cement slurry comprising particulates, wherein the particulates comprise a unsaturated hydrocarbon and a hydrogenation catalyst to provide a set cement,
   whereby microfractures that form in the set cement are self-healed via reaction, catalyzed by the hydrogenation catalyst, of hydrogen migrating into the microfractures with the unsaturated hydrocarbon of the particulates to prevent further hydrogen migration through the set cement.

15. The method of claim 14 further comprising storing hydrogen in the well, wherein the set cement serves as hydrogen containment, wherein the hydrogen migrating to the microfractures comprises stored hydrogen.

16. The method of claim 14, wherein the hydrogen migrating into the microfractures comprises geological/formation hydrogen.

17. The method of claim 14, wherein the hydrogen migrating into the microfractures comprises hydrogen produced by a hydrogen generator in the cement slurry.

18. A well comprising:

a set cement produced by allowing a cement slurry to set, wherein the cement slurry comprises: particulates, wherein the particulates comprise a unsaturated hydrocarbon and a hydrogenation catalyst; and hydrogen migrating into microfractures of the set cement which reacts with the unsaturated hydrocarbon via hydrogenation reaction, catalyzed by the hydrogenation catalyst, to self-heal the microfractures, thus minimizing and/or preventing further migration of the hydrogen into the microfractures.

19. The well of claim 18, wherein the well is a hydrogen storage well, and wherein the hydrogen migrating into the microfractures comprises hydrogen that was stored in the hydrogen storage well.

20. The well of claim 18, wherein the hydrogen migrating into the microfractures comprises geological/formation hydrogen, and/or wherein the hydrogen migrating into the microfractures comprises hydrogen generated by a hydrogen generator in the cement slurry.

\* \* \* \* \*